(12) United States Patent
Agrawal et al.

(10) Patent No.: US 11,403,323 B2
(45) Date of Patent: Aug. 2, 2022

(54) ILLUMINATING DATA RELATED TO APPLICATION

(71) Applicant: COLORTOKENS, INC., Santa Clara, CA (US)

(72) Inventors: Sanjay Kumar Agrawal, Santa Clara, CA (US); Vishnu Gopal Singhal, Bangalore (IN); Pradeep Kishore Somesula, Bangalore (IN); Ruchir Gupta, Santa Clara, CA (US)

(73) Assignee: COLORTOKENS, INC., Santa Clara, CA (US)

( * ) Notice: Subject to any disclaimer, the term of this patent is extended or adjusted under 35 U.S.C. 154(b) by 326 days.

(21) Appl. No.: 16/521,362

(22) Filed: Jul. 24, 2019

(65) Prior Publication Data

US 2021/0026871 A1    Jan. 28, 2021

(51) Int. Cl.
*G06F 16/00* (2019.01)
*G06F 16/28* (2019.01)
*G06F 16/2457* (2019.01)
*G06F 8/61* (2018.01)

(52) U.S. Cl.
CPC .............. *G06F 16/285* (2019.01); *G06F 8/61* (2013.01); *G06F 16/24578* (2019.01)

(58) Field of Classification Search
CPC ............. G06F 11/3006; G06F 11/3072; G06F 16/2246; G06F 16/2379; G06F 8/61; G06F 11/3409; G06F 11/3476; G06F 2201/865; G06F 9/546; G06F 11/0709; G06F 11/0748; G06F 11/0793; G06F 11/301; G06F 11/302; G06F 11/3031; G06F 11/3055; G06F 11/3062; G06F 11/3096; G06F 11/3452; G06F 11/3612; G06F 11/3624; G06F 1/32; G06F 1/3203; G06F 1/3206; G06F 2009/45591; G06F 2201/805; G06F 2201/81; G06F 9/45558; G06F 9/4881; G06F 9/542; G06F 11/3048; G06F 11/321; G06F 11/324; G06F 11/3438; G06F 11/3447; G06F 11/3466; G06F 12/0223; G06F 16/217; G06F 21/57; G06F 3/011; G06F 3/016; G06F 3/0346

See application file for complete search history.

(56) References Cited

U.S. PATENT DOCUMENTS

| 2013/0346945 | A1* | 12/2013 | Yousouf | .................... G06F 8/60 |
| | | | | 717/121 |
| 2017/0046246 | A1* | 2/2017 | Kaulgud | .............. G06F 11/3664 |
| 2017/0315795 | A1* | 11/2017 | Keller | ................. G06F 11/3409 |
| 2018/0115463 | A1* | 4/2018 | Sinha | ................... H04L 41/5009 |

* cited by examiner

*Primary Examiner* — Yicun Wu
(74) *Attorney, Agent, or Firm* — Barry Choobin; Patent 360LLC

(57) ABSTRACT

A method and system to illuminate data related to an application, has been described. Initially a data analyzer at an application is installed. Next the installed data analyzer analyzes the data related to the application. Finally based on the analysis, the data is categorized in one or more of a plurality of categories.

8 Claims, 3 Drawing Sheets

ILLUMINATING DATA RELATED TO APPLICATION

BACKGROUND

The growth of internet in the last two decades has led to a parallel growth of applications or apps. Currently almost every business entity has a corresponding app that allows a user to interact with the company. In order to facilitate a user's interaction with the app, the app requires several inputs from user including user's personal data. Further the app may also require providing access to third party app address, etc.

The data flowing through the app and outside the app needs to be monitored and analysed for several reasons. For example, there are security concerns with respect to user data theft for the user data provided at the app. Further there are international regulations like General Data Protection Regulation (GDPR) with respect to maintaining user data which needs to be complied with in order for the app to be used by a user in European Union. Current a user manually reviews and classifies data flowing through the application. For example, a user may scan logs and system files related to the application to review and classify the data flowing through the application. A manual process to review and classify data is tedious and prone to error. Therefore there is a need for automated review and classification of application data.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

DETAILED DESCRIPTION

Figure 1:
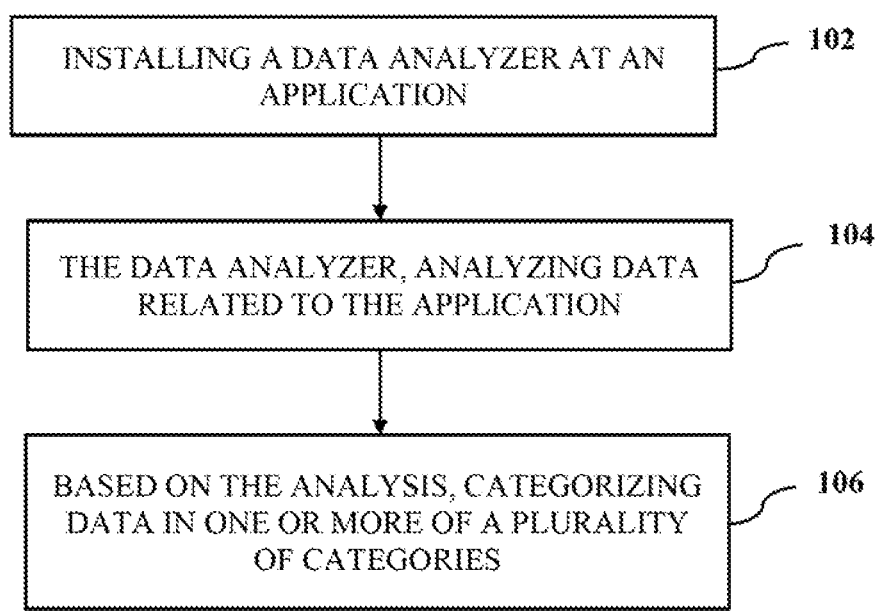
FIG. 1 is a block diagram illustrating a process to illuminate data related to an application, according to an embodiment.

Embodiments of techniques of illuminating data related to an application are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail. Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Data illumination is the process of identifying various information related a data. For example, a data illumination operation may identify the user accessing the data, the location where the data is being accessed, and the type of data being accessed. In one embodiment, the data being illuminated is an application data. An application is a software designed to perform a group of coordinated functions, tasks, or activities for the benefit of the user. Examples of an application include traditional applications such as word processor, spreadsheets, Email client, media player or new applications such as maps, chat applications, etc.

An application has a Unique resource Locator (URL) that is the address used to access the application over the internet. An application can also access and communicate with several external destinations via their URLs or their address/file-path. External destinations include file, databases, web APIs, etc. An application data includes data flowing into the application, for example, application data received from a user or of other external destinations that are accessing the application. An application data also includes data flowing across external destinations, for example data received or sent to the external destinations that the application access.

In one embodiment, illumination of the application data includes categorizing the data into one of the several pre-defined categories. For example, pre-defined categories include authentication, personal identifiable information, purchase information, health information, and user tracking information. An authentication information may represent an information that is used to authenticate a user, for example, a user name and password. A personal identifiable information (PII) includes personal information related to a user, for example, user name, address, etc. A purchase information includes any information related to sales or purchase made using the application. A health information may include health information related to the user. User tracking information includes information related to the user's location, etc. In one embodiment, the different information related to the application needs to be categorized and process properly in order to meet different regulatory requirements, for example GDPR requirement.

FIG. 1 is a block diagram illustrating a process 100 to illuminate data related to an application, according to an embodiment. In order to illuminate data related to the application, a data analyser is initially installed at the application (102). In one embodiment, a data analyser is a component that instruments the application. Instrumenting the application is an ability to monitor or measure level of an application performance, to diagnose error, and to write trace information. In one embodiment, the data analyser retrieves data related to the application. The data analyser retrieves data flowing across different external destination Next the installed data analyzer analyzes data related to the application (104). In one embodiment, the data analyser analyses the retrieved application data flowing across different external destinations. For example, the data being sent and received to the different external destinations. In order to analyse the data, the data analyser matches the data with predefined keywords and patterns mapped to the different categories. Based on the matching, a score is determine for the data corresponding to each of the categories. In one embodiment, the score is determined based on the keywords and pattern in the retrieved data matched to the predefined keywords and patterns mapped to the different categories.

Finally, based on the analysis the data is categorized in one of the one or more categories (106). In one embodiment, the data is categorized to the category with the highest determined score. For example, in case the determined score is highest for the category "user authentication" then the data is mapped to the category "user authentication".

Figure 2:
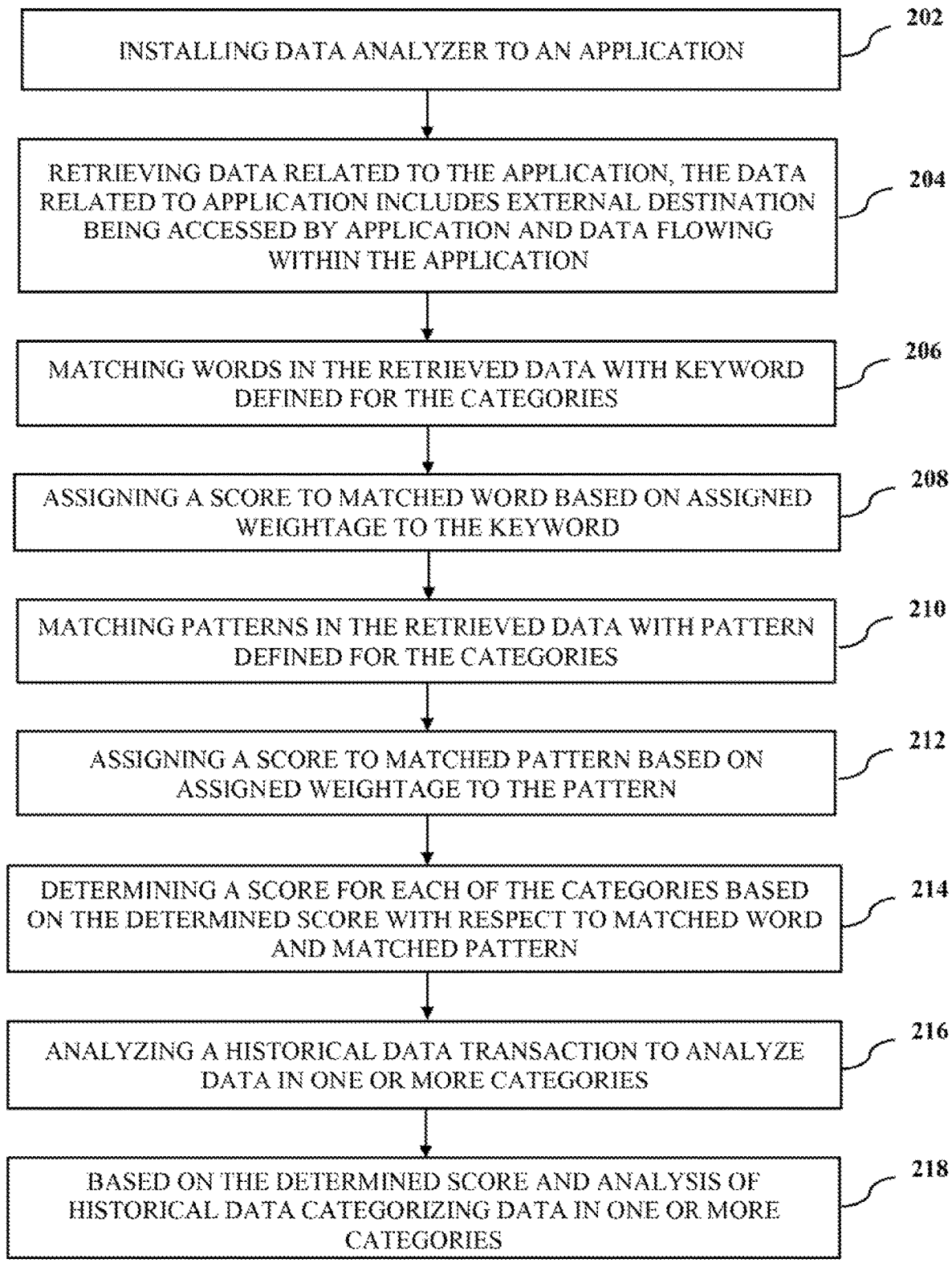
FIG. 2 is a block diagram illustrating a detailed process to illuminate data related to an application, according to an embodiment.

FIG. 2 is a detailed block diagram illustrating a process 200 to illuminate data related to an application, according to an embodiment. Initially a data analyser is installed at the application (202). The installed application then retrieves the data relating to the application (204). In one embodiment, the data related to the application include application data flowing to external destination and data flowing within the application. Next a word in the retrieved data is matched with the keywords defined for the plurality of categories (206). Based on the matching, a score is assigned to the matched word included in the retrieved data (208). In one embodiment, the data analyser stores a configurable defined keyword for each category. For each data destination record, it searches for the keyword those are defined in the file. Based on the number of keywords mapped in each category and the weightage of keyword defined in the xml file, it calculates keyword scores. For example. if in the destination, the categories occurrence is two from different categories, then, the scores would be given as 0.5 & 0.5 for the matching categories, given the weightage is same for both the keywords. In one embodiment, the scores are assigned such that the total score is always equal to 1. An example of a snippet of keyword file with score for different keywords is shown below:—

```
<UserScan>
<keywordScan name-"GDPR" version="1.0">
    <dataCategory name="pii" weight="1" sensitive="0" full_word="1">
        <keywordGroupname="people" weight="1" sensitive="0" full_word="1">
            <keywordItem>firstname</keywordItem>
            <keywordItem>first_name</keywordItem>
            -..........................
            <!--<keywordItem>...</keywordItem> -->
        </keywordGroup>
        ........................
    </dataCategory>
</keywordScan>
```

Next a pattern in the retrieved data is matched with the patterns defined for the plurality of categories (210). Based on the matching, a score is assigned to the matched pattern included in the retrieved data (212). A score is similar to the above, but instead of the keywords, defined. This works based on the regular expression for each type/category configured in the pattern matching file. This file is configurable to accommodate a greater number of regular expressions. It can also configurable to validate against case sensitive pattern.

Example Snippet of the Pattern Matching JSON File.

```
[
{"name": "EMAIL_ADDRESS",
"regex": "([a-z0-9!#$%&'*+\\/=?^_' {|}~-]+@([a-z0-9]+\\.)+([a-z0-9]+))",
"type" : "PII",
"CASE_INSENSITIVE": true,
    "MULTILINE": true
},
```

Next a score is determined for each of the categories based on the determined score with respect to matched word and matched pattern (214). For example, the below code snippet shows an SQL query obtained after determining the score for each of the matched words mapped to the different categories and score for each of the matched patterns mapped to the different categories. As the mapped words CUSTOMER_ID, EMAIL, PHONE and the patterns are mapped to the category Personal Identification Information (PII), the category PH receives a score of 1. Example:

```
"type: JDBC
entry_detail {
        key: "connection-url"
        value: "jdbc:mysql://db_usr_mgmt:3306/USR_MGMT?allowMultiQueries=true"}
    entry_detail {
    key: "query"
```

```
    value: "select CUSTOMER_ID, EMAIL, PHONE, TAGS from USER here
    CUSTOMER_ID=\'vishnu\'; "}
    entry_detail {
    key: "keyword-match-score"
    value: "0.0,0.0,0.0,0.0,1.0,0.0,0.0,0.0"
}
entry_detail {
key: "pattern-matching-score"
value: "0.0,0.0,0.0,0.0,0.0,0.0,1.0,0.0"
}"
```

Next a historical data transaction is analysed to categorize the data in one or more categories (216). In one embodiment, categorization is done based on the historical transactions count. To give an example, let's say a source URL is accessing two destinations D1 & D2 respectively. If S1 has accessed destination D1 1000 times which is authentication category, and if other destination D2 is accessed 100 times, which is health category, then the source will be categorized more on the authentication with some weightage on health. If the same D2 destination access count increases, then the category of S1 would more on the health. System is also provisioned to change the category of a destination to user defined. Then there wouldn't be any analysis (both keyword & pattern matching would be applied on the same).

Finally based on the determined score for the one or more categories (at 214) and the analysis of historical data transaction (at 216) the data is categorized in one or more categories (218). In one embodiment, the aggregation of score is done over a period of time, using the weightage on the number of times the destination is accessed, its old score (category), the current score and then a new score will be calculated. In one embodiment, this process is continuous as and when transaction is happening, and the instrumentation keeps on sending the data.

Figure 3:
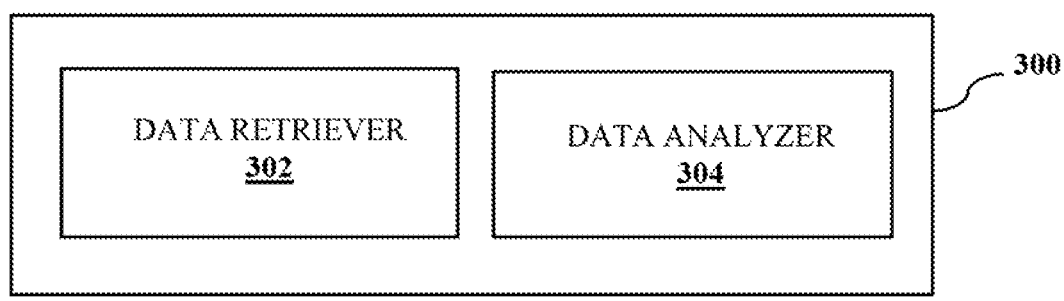
FIG. 3 is a block diagram illustrating a system to illuminate data related to an application, according to an embodiment.

FIG. 3 is a block diagram of a system 300 to illuminate data related to an application, according to an embodiment. The data analyzer 300 includes a data retriever 302 that retrieves data related to an application. In one embodiment, the data retriever is a Java Agent that sends data to a data analyzer 304 using a data pipeline, for example Kafka®. The data analyzer then determines the scores of the different categories based on matching keywords and patterns and finally categories the data to one of the categories.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitory, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction

What is claimed is:

1. A computer-implemented method for illuminating data corresponding to an application, said method comprising the following implemented steps:
    triggering instrumentation of said application and retrieving data corresponding to said application;
    triggering an analysis of retrieved data and identifying keywords and patterns corresponding to said retrieved data;
    comparing, by a processor, each of said keywords corresponding to said retrieved data, with a plurality of predefined keywords, wherein each of said predefined keywords is mapped to at least one of a plurality of categories, and wherein each of said predefined keywords is assigned a predetermined weightage;
    determining, by said processor, a keyword score for each of said plurality of categories, based on a match between each of said keywords corresponding to said retrieved data and each of said predefined keywords mapped to at least one of said plurality of categories;
    comparing, by said processor, each of said patterns corresponding to said retrieved data, with a plurality of predefined patterns, and wherein each of said predefined patterns is mapped to at least of said plurality of categories, and wherein each of said predefined patterns are represented as regular expressions;
    determining, by said processor, a pattern score for each of said plurality of categories, based on a match between each of said patterns corresponding to said retrieved data and each of said predefined patterns mapped to at least one of said plurality of categories;
    determining, by said processor, a final score for each of said plurality of categories, based on said keyword score and pattern score;
    analyzing, by said processor, a historical data transaction, and determining, by said processor, data destinations accessed by said historical data transaction, wherein each of said data destinations is mapped to at least of said plurality of categories;
    assigning, by said processor, a weightage to each of said plurality of categories, based on a frequency with which each of said plurality of categories are accessed by said historical data transaction;
    categorizing, by said processor, said historical data transaction into a particular category amongst said plurality of categories, based on said weightage assigned to each of said plurality of categories; and
    categorizing said retrieved data into at least one of said plurality of categories, based on said final score for each of said plurality of categories and further based on categorization of said historical data transaction into said particular category.

2. The computer-implemented method as claimed in claim 1, wherein the step of retrieving said data corresponding to said application, further includes a step of retrieving data flowing within said application and data flowing from said application to external data destinations.

3. The computer-implemented method as claimed in claim 1, wherein the step of determining said keyword score, further includes a step of determining said keyword score based on said weightage assigned to each of said predefined keywords matching said keywords corresponding to said retrieved data.

4. A computer-implemented system for illuminating data corresponding to an application, the computer-implemented system comprising:
- a computer-readable memory storing program code for illuminating said data corresponing to said application;
- a processor communicably coupled to said memory, said processor configured to execute said program code stored in said memory and thereby:
  - perform instrumentation of said application and retrieve data corresponding to said application;
  - analyze retrieved data and identify keywords and patterns corresponding to said retrieved data;
  - compare each of said keywords corresponding to said retrieved data, with a plurality of predefined keywords, wherein each of said predefined keywords is mapped to at least one of a plurality of categories, and wherein each of predefined keywords is assigned a predetermined weightage;
  - determine a keyword score for each of said plurality of categories, based on a match between each of said keywords corresponding to said retrieved data and each of said predefined keywords mapped to at least one of said plurality of categories;
  - compare each of said patterns corresponding to said retrieved data, with a plurality of predefined patterns, and wherein each of said predefined patterns is mapped to at least of said plurality of categories, and wherein each of said predefined patterns are represented as regular expressions;
  - determine a pattern score for each of said plurality of categories, based on a match between each of said patterns corresponding to said retrieved data and each of said predefined patterns mapped to at least one of said plurality of categories;
  - determine a final score for each of said plurality of categories, based on said keyword score and pattern score;
  - analyze a historical data transaction, and determine data destinations accessed by said historical data transaction, wherein each of said data destinations is mapped to at least of said plurality of categories;
  - assign a weightage to each of said plurality of categories, based on a frequency with which each of said plurality of categories are accessed by said historical data transaction;
  - categorize said historical data transaction into a particular category amongst said plurality of categories, based on said weightage assigned to each of said plurality of categories; and
  - categorize said retrieved data into at least one of said plurality of categories, based on said final score for each of said plurality of categories and further based on categorization of said historical data transaction into said particular category.

5. The computer-implemented system as claimed in claim 4, wherein said data retrieved by said processor includes data flowing from said application to external data destinations and data flowing within the said application.

6. The computer-implemented system as claimed in claim 4, wherein said processor is further configured to determine said keyword score based on weightage assigned to each of said predefined keywords matching said keywords corresponding to said retrieved data.

7. A non-transitory computer-readable storage medium having computer-executable instructions stored thereon, said instructions that when executed by a processor, causes said processor to:
- perform instrumentation of said application and retrieve data corresponding to said application;
- analyze retrieved data and identify keywords and patterns corresponding to said retrieved data;
- compare each of said keywords corresponding to said retrieved data, with a plurality of predefined keywords, wherein each of said predefined keywords is mapped to at least one of a plurality of categories, and wherein each of said predefined keywords is assigned a predetermined weightage;
- determine a keyword score for each of said plurality of categories, based on a match between each of said keywords corresponding to said retrieved data and each of said predefined keywords mapped to at least one of said plurality of categories;
- compare each of said patterns corresponding to said retrieved data, with a plurality of predefined patterns, and wherein each of said predefined patterns is mapped to at least of said plurality of categories, and wherein each of said predefined patterns are represented as regular expressions;
- determine a pattern score for each of said plurality of categories, based on a match between each of said patterns corresponding to said retrieved data and each of said predefined patterns mapped to at least one of said plurality of categories;
- determine a final score for each of said plurality of categories, based on said keyword score and pattern score;
- analyze a historical data transaction, and determine data destinations accessed by said historical data transaction, wherein each of said data destinations is mapped to at least of said plurality of categories;
- assign a weightage to each of said plurality of categories, based on a frequency with which each of said plurality of categories are accessed by said historical data transaction;
- categorize said historical data transaction into a particular category amongst said plurality of categories, based on said weightage assigned to each of said plurality of categories; and
- categorize said retrieved data into at least one of said plurality of categories, based on said final score for each of said plurality of categories and further based on categorization of said historical data transaction into said particular category.

8. The computer-executable instructions as claimed in claim 7, wherein said instructions, when executed by said processor, further cause said processor to:
- retrieve data flowing from said application to external data destinations and data flowing within said application;
- determine said keyword score based on weightage assigned to each of said predefined keywords matching said keywords corresponding to said retrieved data.

* * * * *